US011456642B2

(12) United States Patent
Suzuki et al.

(10) Patent No.: US 11,456,642 B2
(45) Date of Patent: Sep. 27, 2022

(54) MOTOR DEVICE INCLUDING CONNECTION LINES AND ROTATION DETECTION UNIT CONFIGURATION

(71) Applicants: DENSO CORPORATION, Kariya (JP); ADVICS CO., LTD., Kariya (JP)

(72) Inventors: Takumi Suzuki, Kariya (JP); Motoki Uehama, Kariya (JP); Atsushi Inoue, Kariya (JP)

(73) Assignees: DENSO CORPORATION ADVICS CO., LTD., Aichi-Pref (JP); ADVICS CO., LTD., Kariya (JP)

( * ) Notice: Subject to any disclaimer, the term of this patent is extended or adjusted under 35 U.S.C. 154(b) by 524 days.

(21) Appl. No.: 16/542,040

(22) Filed: Aug. 15, 2019

(65) Prior Publication Data

US 2020/0067381 A1    Feb. 27, 2020

(30) Foreign Application Priority Data

Aug. 21, 2018 (JP) .............................. JP2018-154495

(51) Int. Cl.
| | | |
|---|---|---|
| *H02K 7/10* | (2006.01) | |
| *H02K 7/106* | (2006.01) | |
| *F16D 49/12* | (2006.01) | |
| *F16D 63/00* | (2006.01) | |

(52) U.S. Cl.
CPC ............. *H02K 7/106* (2013.01); *F16D 49/12* (2013.01); *F16D 63/002* (2013.01)

(58) Field of Classification Search
CPC ........ B60T 8/368; B60T 8/4022; F16D 49/12; F16D 63/002; H02K 11/33; H02K 3/522; H02K 5/225; H02K 7/106
See application file for complete search history.

(56) References Cited

U.S. PATENT DOCUMENTS

| | | | | |
|---|---|---|---|---|
| 11,159,073 | B2 * | 10/2021 | Hotori | .................... H02K 5/225 |
| 2008/0211332 | A1 | 9/2008 | Kataoka et al. | |
| 2012/0229005 | A1 | 9/2012 | Tominaga et al. | |
| 2014/0030124 | A1 * | 1/2014 | Hoj | ..................... F04D 13/0693 |
| | | | | 417/423.7 |
| 2015/0061366 | A1 | 3/2015 | Shimada et al. | |
| 2015/0274138 | A1 | 10/2015 | Heise | |
| 2016/0091039 | A1 | 3/2016 | Masuda | |
| 2019/0043061 | A1 * | 2/2019 | Hotori | .................... G06Q 30/02 |
| 2021/0075301 | A1 * | 3/2021 | Ichikawa | ............... H02K 16/04 |

FOREIGN PATENT DOCUMENTS

| | | |
|---|---|---|
| JP | H10304624 A | 11/1998 |
| JP | 2009-196627 A | 9/2009 |
| JP | 2011-179658 A | 9/2011 |
| JP | 2013-135531 A | 7/2013 |

(Continued)

*Primary Examiner* — Naishadh N Desai
(74) *Attorney, Agent, or Firm* — Maschoff Brennan

(57) ABSTRACT

A motor device includes a motor body having a stator and a rotor, and an EDU for controlling the motor body. A hydro unit is disposed between the motor body and the EDU (Electric Driver Unit). In the motor body, a plurality of terminal lines for energizing the coil of the stator and the EDU is drawn around, and a rotation detection unit for detecting the rotation of the rotor is provided a space formed between the plurality of drawn terminal lines and the rotation shaft of the motor.

11 Claims, 3 Drawing Sheets

(56) References Cited

FOREIGN PATENT DOCUMENTS

| JP | 5883836 | B2 | | 3/2016 | |
|----|---------|----|---|--------|---|
| JP | 6139472 | B2 | | 5/2017 | |
| JP | 2017-104010 | A | | 6/2017 | |
| JP | 6227056 | B1 | * | 11/2017 | ........... H02K 11/048 |
| WO | WO-0051863 | A1 | * | 9/2000 | .............. B60T 8/368 |
| WO | WO-2012160622 | A1 | * | 11/2012 | .............. H02K 11/33 |
| WO | WO-2015198476 | A1 | * | 12/2015 | ........... B62D 5/0403 |
| WO | WO-2017068636 | A1 | * | 4/2017 | .............. B23P 19/02 |

* cited by examiner

MOTOR DEVICE INCLUDING CONNECTION LINES AND ROTATION DETECTION UNIT CONFIGURATION

CROSS REFERENCE TO RELATED APPLICATION

The present application is based on Japanese Patent Application No. 2018-154495 filed on Aug. 21, 2018, disclosure of which is incorporated herein by reference.

TECHNICAL FIELD

The present invention relates to a motor device.

BACKGROUND

An electric brake system is known which performs a braking operation electrically with a motor device as a drive source. In such an electric brake system, a hydro unit, such as a pump, for example, is drivingly connected directly or indirectly on the output side of the rotation shaft of the motor device. The motor device is driven to generate a desired hydraulic pressure.

SUMMARY

A motor device has a motor body including a stator and a rotor, and a control unit for controlling the motor body. A hydro unit is disposed between the motor body and the control unit. In the motor body, a plurality of connection lines for conducting electricity between a coil of the stator and the control unit are drawn around. A rotation detection unit for detecting the rotation of the rotor is provided in a space formed between the drawn connection lines and the motor rotation shaft.

DETAILED DESCRIPTION

Figure 1:
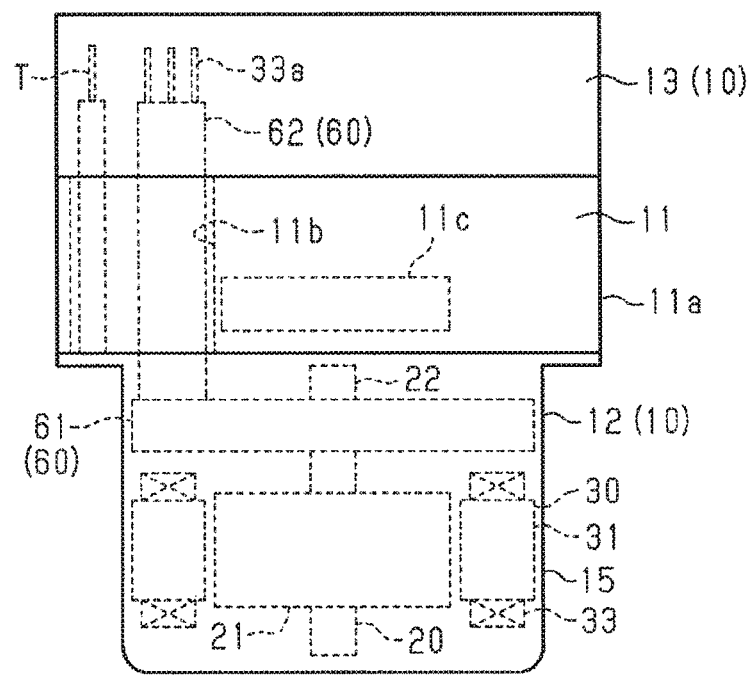
FIG. 1 is a schematic configuration diagram of a motor device according to an embodiment.

Hereinafter, an embodiment of a motor device will be described with reference to the drawings. In the drawings, for convenience of explanation, part of the configuration may be shown exaggerated or simplified. Also, the dimensional ratio of each part may be different from the actual one.

As shown in FIG. 1, the motor device 10 is used in an electric brake system. The electric brake system includes a hydro unit 11 that adjusts the hydraulic pressure of the brake fluid, and the motor device 10 that drives the hydro unit 11. The motor device 10 includes the motor body 12 connected to the hydro unit 11 to drive the hydro unit 11, and an EDU (Electric Driver Unit) 13 as a control unit for controlling the drive of the motor body 12. In the brake system of this example, the hydro unit 11 is interposed between the EDU 13 and the motor body 12. The motor body 12 and the EDU 13 are electrically connected through an insertion hole 11b provided in the housing 11a of the hydro unit 11.

The motor body 12 of the present embodiment has a rotor 20 and a stator 30 inside the housing 15. The housing 15 has a substantially bottomed cylindrical yoke housing 16 and an end frame 17 closing an opening portion 16a of the yoke housing 16. The end frame 17 is made of, for example, a conductive member such as iron. The end frame 17 has an axially recessed recess 17a at its central position. Here, since the recess 17a of the end frame 17 has a shape that is recessed in the axial direction, the end frame 17 has a protrusion 17b protruding radially inward at a position opposite to an opening side of the recess 17a. That is, the recess 17a and the protrusion 17b are integral with each other. The recess 17a and the protrusion 17b are inserted into the yoke housing 16 in a state that the end frame 17 is attached to the yoke housing 16.

As shown in FIG. 1, the rotor 20 has a rotor core 21, magnets (not shown) provided on the rotor core 21, and a rotation shaft 22 provided at the radial center of the rotor core 21. The rotation shaft 22 is rotatably supported by a bearing B1 provided at the center of the bottom 16b of the yoke housing 16 and a bearing B2 provided at the center of the recess 17a of the end frame 17.

One end of the rotation shaft 22 in the axial direction is directly or indirectly connected to the gear 11c in the hydro unit 11. As a result, when the rotation shaft 22 is rotationally driven, the gear 11c in the hydro unit 11 is driven to adjust the hydraulic pressure of the brake fluid.

Figure 2:
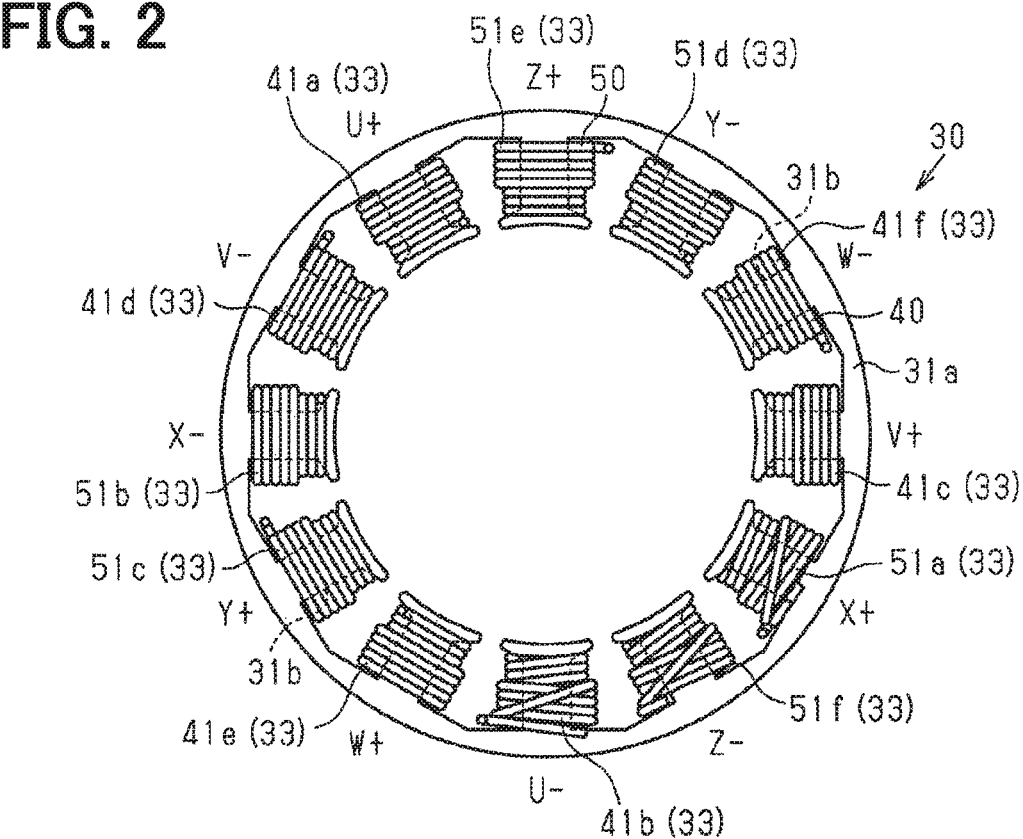
FIG. 2 is a plan view of the stator showing a state in which a guide member in the same embodiment is removed.
Figure 3:
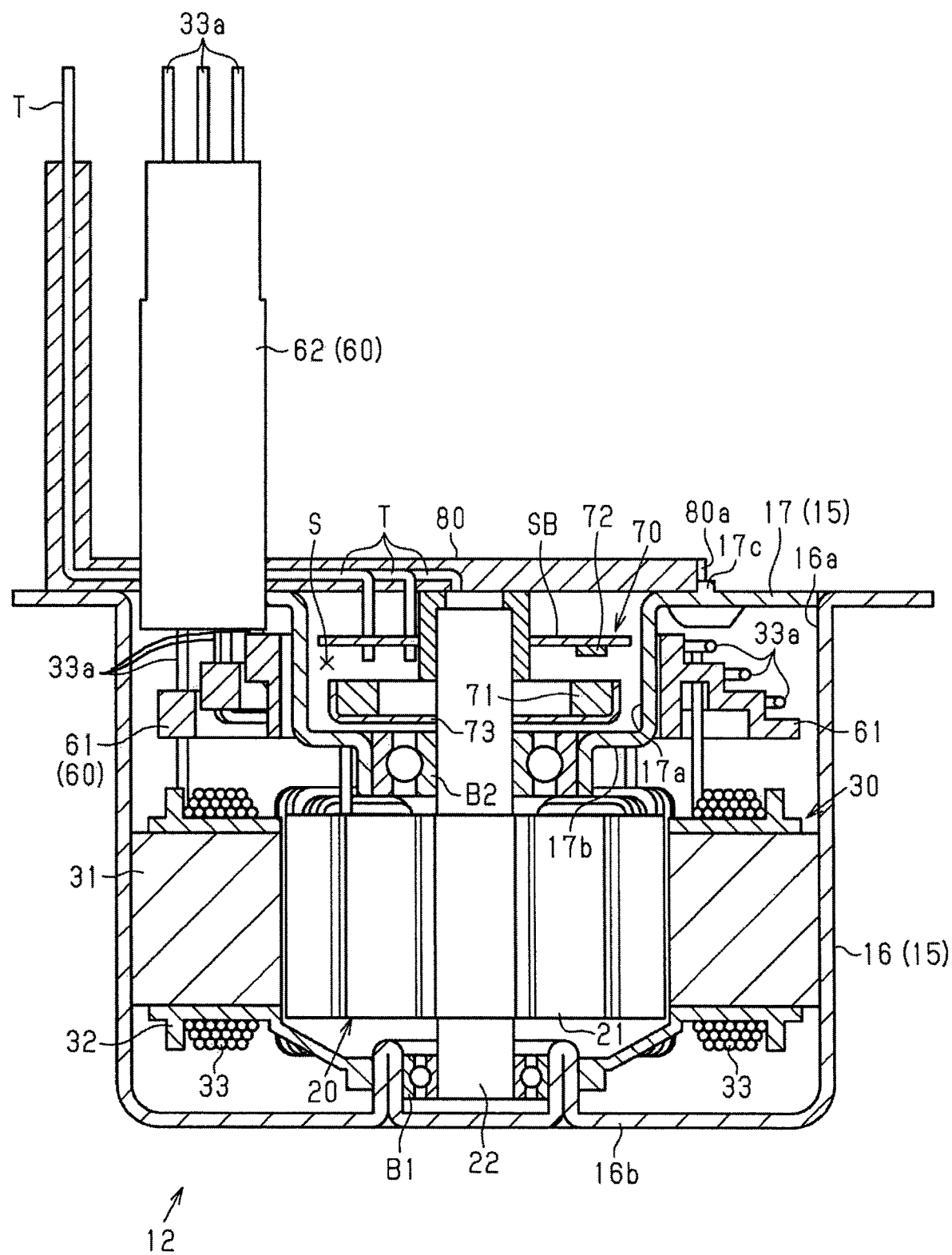
FIG. 3 is a cross-sectional view of the motor device according to the same embodiment.

As shown in FIGS. 2 and 3, the stator 30 includes a stator core 31, an insulator 32 of the stator core 31, and a stator coil 33 as a coil.

The stator core 31 has a substantially annular portion 31a and a plurality of teeth 31b extending radially inward from the annular portion 31a. For example, twelve teeth 31b of the present embodiment are provided. A stator coil 33 is wound around each tooth 31b via an insulator 32. The stator coil 33 is wound by, for example, concentrated winding.

Stator coil 33 includes a first three-phase winding 40 electrically connected to a first inverter circuit (not shown), and a second three-phase winding 50 electrically connected to a second inverter circuit (not shown). That is, in the present embodiment, two inverter circuits supply current to each of the three-phase windings 40 and 50 to excite them.

As shown in FIG. 2, the first three-phase winding 40 has a plurality of three-phase windings 41a to 41f to which three-phase alternating current having a phase difference of 120 degrees is supplied from the first inverter circuit. The plurality of three-phase windings 41a to 41f includes U+phase winding 41a, U−phase winding 41b, V+phase winding 41c, V−phase winding 41d, W+phase winding 41e, W−phase winding 41f.

As shown in FIG. 2, the second three-phase winding 50 has a plurality of three-phase windings 51a to 51f to which three-phase alternating current having a phase difference of 120 degrees is supplied from the second inverter circuit. The plurality of three-phase windings 51a, to 51f include Z+phase winding 51a, X−phase winding 51b, Y+phase winding 51c, Y−phase winding 51d, Z+phase winding 51e, and Z−phase winding 51f.

The stator coil 33 of the present embodiment is wound, for example, in the order of U+phase winding 41a, Z+phase winding 51a, Y−phase winding 51d, W−phase winding 41f, V+phase winding 41c, X+phase winding 51a, Z−phase winding 51f, U−phase winding 41b, W+phase winding 41e, Y+phase winding 51c, X−phase winding 51b, V−phase winding 41d for each tooth 31b.

Here, the winding direction in which the U+phase winding 41a and the U−phase winding 41b are wound around the teeth 31b is opposite to each other. The winding direction in which the V+phase winding 41c and the V−phase winding 41d are wound around the teeth 31b is opposite to each other. Further, the winding direction in which the W+phase winding 41e and the W−phase winding 41f are wound around the teeth 31b is opposite to each other. The U+phase winding 41a and the U−phase winding 41b are wound around teeth 31b provided at positions different by 150 degrees in the circumferential direction. The V+phase winding 41c and the V−phase winding 41d are wound around teeth 31b provided at positions different by 150 degrees in the circumferential direction. The W+phase winding 41e and the W−phase winding 41f are wound around teeth 31b provided at positions different by 150 degrees in the circumferential direction.

Furthermore, the winding direction in which the X+phase winding 51a and the X−phase winding 51b are wound around the teeth 31b is opposite to each other. The winding direction in which the Y+phase winding 51c and the Y−phase winding 51d are wound around the teeth 31b is opposite to each other. Further, the winding direction in which the Z+phase winding 51e and the Z−phase winding 51f are wound around the teeth 31b is opposite to each other. The X+phase winding 51a and the X−phase winding 51b are wound around teeth 31b provided at positions different by 150 degrees in the circumferential direction. The Y+phase winding 51c and the Y−phase winding 51d are wound around teeth 31b provided at positions different by 150 degrees in the circumferential direction. The Z+phase winding 51e and the Z−phase winding 51f are wound around teeth 31b provided at positions different by 150 degrees in the circumferential direction.

U+phase winding 41a and U−phase winding 41b are connected by a crossover line (not shown). The V+phase winding 41c and the V−phase winding 41d are connected by a crossover line (not shown). W+phase winding 41e and W−phase winding 41f are connected by a crossover line (not shown). X+phase winding 51a and X−phase winding 51b are connected by a crossover line (not shown). The Y+phase winding 51c and the Y−phase winding 51d are connected by a crossover line (not shown). Z+phase winding 51e and Z−phase winding 51f are connected by a crossover line (not shown).

The first three-phase winding 40 of the present embodiment is connected to the first inverter circuit in a delta connection. The second three-phase winding 50 is connected to the second inverter circuit in a delta connection. More specifically, a terminal line 33a of the U+phase winding 41a is connected to a terminal of the first inverter circuit that is electrically identical, together with the terminal line 33a of the W−phase winding 41f. The terminal line 33a of the U−phase winding 41b is connected to the terminal of the first inverter circuit that is electrically identical, together with the terminal line 33a of the V+phase winding 41c. The terminal line 33a of the W+phase winding 41e is connected to the terminal of the first inverter circuit that is electrically identical, together with the terminal line 33a of the V−phase winding 41d.

The terminal line 33a of the X−phase winding 51b is connected to the terminal of the second inverter circuit that is electrically identical, together with the terminal line 33a of the Y+phase winding 51c. The terminal line 33a of the Y−phase winding 51d is connected to the terminal of the second inverter circuit that is electrically identical, together with the terminal line 33a of the Z+phase winding 51e. The terminal line 33a of the Z−phase winding 51f is connected to the terminal of the second inverter circuit that is electrically identical, together with the terminal line 33a of the X+phase winding 51a. Each of the terminal lines 33a described above is a flexible conductive wire integrally formed with each of the windings 40 and 50.

As shown in FIG. 1, the stator 30 has a guide member 60 on the side of the hydro unit 11 which is one side in the axial direction of the stator core 31.

The guide member 60 guides the terminal line 33a of the stator coil 33 to the EDU 13, and has a guide main body 61 and a pullout guide 62.

The guide main body 61 is configured to have a substantially annular shape, and the terminal lines 33a are drawn along the guide main body 61.

The pullout guide 62 is configured to have a long columnar shape along the axial direction. The pullout guide 62 has a plurality of through holes, and each of the terminal lines 33a is inserted into each of the through holes. The pullout guide 62 is made of, for example, an insulating material such as a resin. Therefore, the terminal line 33a inserted into the through hole of the pullout guide 62 is insulated from the other terminal line 33a inserted into the other through hole. Similarly, the terminal lines 33a inserted into the respective through holes of the pullout guide 62 are insulated with respect to the housing 11a of the hydro unit 11.

Further, the motor device 10 of the present embodiment includes a rotation detection unit 70 that detects the rotation of the rotor 20. The rotation detection unit 70 is provided in the recess 17a of the end frame 17. That is, the rotation detection unit 70 is provided in the space S formed between the motor rotation shaft 22 and the terminal lines 33a drawn in the circumferential direction along the guide member 60.

The rotation detection unit 70 of the present embodiment includes a sensor magnet 71 and a Hall element 72. The sensor magnet 71 is formed in an annular shape, is fixed to the magnet holder portion 73 fixed to the rotation shaft 22, and integrally rotates with the rotation shaft 22 and the rotor 20.

Figure 4:
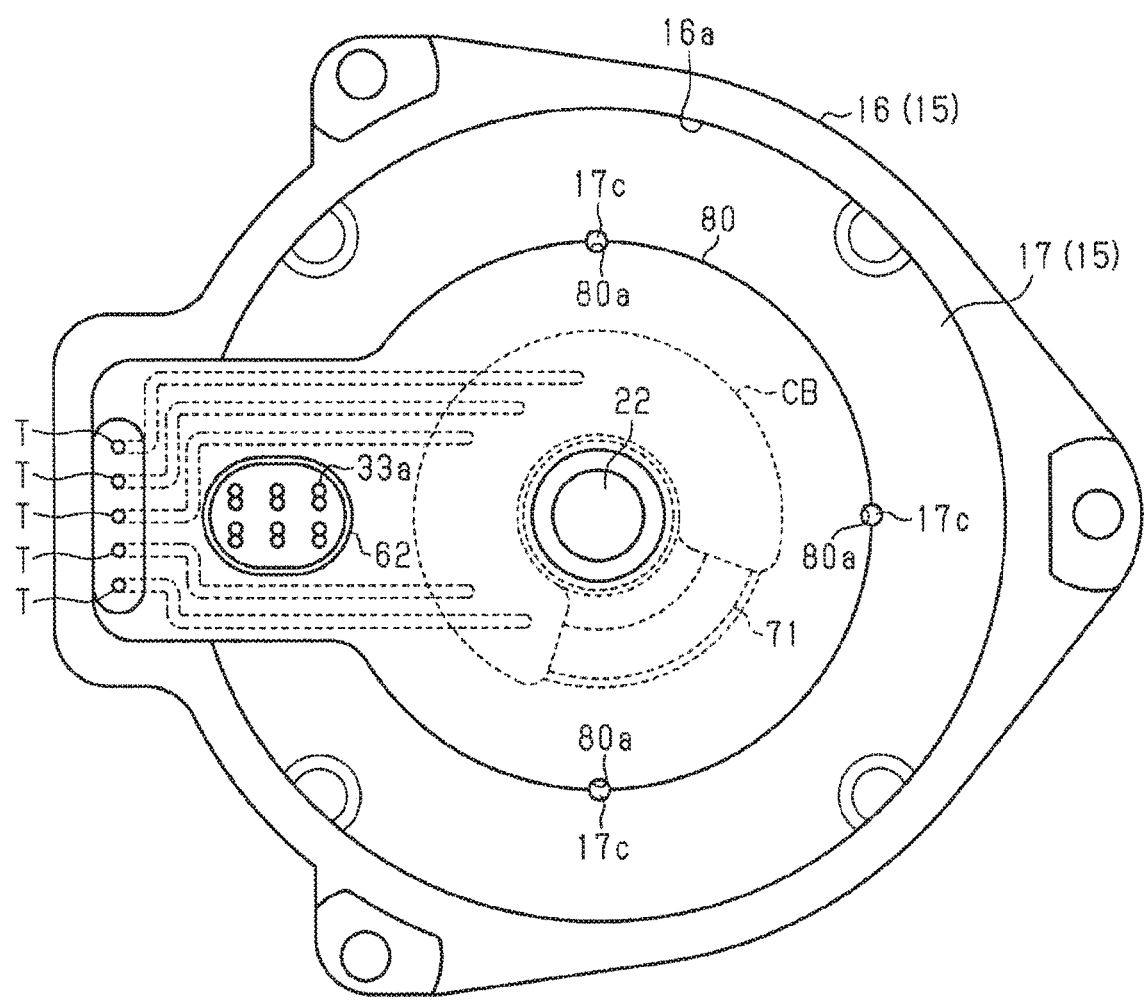
FIG. 4 is a plan view of the motor device according to the same embodiment.

The Hall element 72 is provided on the sensor substrate SB in an arc shape from an axial view, and is disposed to face the sensor magnet 71 in the axial direction. In the present embodiment, three Hall elements 72 are provided on the sensor substrate SB. Terminals T are connected to each Hall element 72 directly or indirectly. The terminal T includes an output terminal for outputting sensor information to the EDU 13 and a power supply terminal for supplying power to each Hall element 72, and a total of five terminals T are provided. Each terminal T is inserted into the insertion hole 11b of the hydro unit 11 together with the terminal line 33a. At this time, the terminal T extends radially outward so as to avoid the terminal line 33a, and is provided in the insertion hole 11b so as to pass through the radially outer side of the terminal line 33a, as shown in FIGS. 3 and 4. The terminal T separates the terminal line 33a in the insertion hole 11b so that the influence of noise due to the terminal line 33a can be suppressed. In addition, in the five terminals T, the lead paths of three terminals for outputting sensor information and the lead paths of two terminals for supplying power are branched into two branches. Thus, five terminals T are collected on the radially outer side of the terminal line 33a.

As shown in FIGS. 3 and 4, the sensor substrate SB and the terminals T are held on a circuit holder 80. The circuit holder 80 is fixed to the end frame 17. In the present embodiment, the circuit holder 80 and the end frame 17 are attached, for example, by bonding or the like. In addition, the fixing of the circuit holder 80 and the end frame 17 is not limited to bonding, and a snap fit structure or the like may be adopted.

In addition, the circuit holder 80 has engagement recesses 80*a*, each of which engages with each of three protrusions 17*c* provided on the end frame 17 in the circumferential direction. Therefore, since the circumferential positioning of the circuit holder 80 with respect to the end frame 17 is performed, the position of the sensor substrate SB held by the circuit holder 80 is also determined. As a result, the Hall element 72 provided on the sensor substrate SB is also positioned.

The function of the present embodiment will be explained.

In the motor device 10 of the present embodiment, power is supplied to each of the windings 40 and 50 constituting the stator coil 33 of the stator 30, whereby each of the windings 40 and 50 are excited so as to generate a rotating magnetic field for rotating the rotor 20. The rotational position of the rotor 20 is detected by the rotation detection unit 70 provided in the recess 17*a* of the end frame 17. The EDU 13 controls the motor device 10 based on the rotational position of the rotor 20 detected by the rotation detection unit 70 to adjust the hydraulic pressure of the brake fluid by the hydro unit 11.

The effects of the present embodiment will be described.

(1) A plurality of terminal lines 33*a* for conducting electricity between the stator coil 33 and the EDU 13 are drawn, and the rotation detection unit 70 is provided in the space S formed between the plurality of drawn terminal lines 33*a* and the motor rotation shaft 22. Therefore, the motor device with such configuration can be miniaturized as compared with a motor device having a rotation detection unit 70 at a position deviating from the space.

(2) The guide member 60 for drawing the terminal lines 33*a* in the circumferential direction is provided on one axial end side of the rotor 20 and radially outward of the rotor 20, whereby the drawing of the terminal lines 33*a* is facilitated. Further, since the rotation detection unit 70 is provided on the inner side in the radial direction of the guide member 60 in which the terminal lines 33*a* are drawn around, miniaturizing can be achieved as described above.

(3) The end frame 17 has a recess 17*a* which is recessed toward the rotor 20 in the axial direction and in which a space S is formed between the rotation shaft 22 and the terminal lines 33*a*. It is possible to reduce the size by providing the rotation detection unit 70 in the recess 17*a*.

(4) Since the end frame 17 is formed of a conductive member, the influence of the magnet provided on the rotor 20 and the magnetic flux generated by the stator 30 can be suppressed from appearing on the Hall element 72 side. It can contribute to the so-called electromagnetic shielding effect.

(5) The terminal T passes radially outside of the terminal line 33*a* while avoiding the terminal line 33*a* extending in the axial direction in the insertion hole 11*b*. By adopting the above mentioned configuration, even when the hydro unit 11 is positioned between the EDU 13 and the motor body 12, the terminal T is derived to the EDU 13 side while suppressing the influence of the gear 11*c* in the hydro unit 11. Further, by drawing out the terminal T so as to avoid the terminal line 33*a* which is a power line, the terminal line 33*a* can be drawn linearly along the axial direction. Therefore, the enlargement in the radial direction of the yoke housing 16 which determines the physique of the motor body 12 can be suppressed.

(6) In the five terminals T of the present embodiment, three terminals T and two terminals T are bifurcated with reference to the terminal line 33*a*. Therefore, the terminals T can be arranged in a well-balanced manner as compared with the case where all terminals are arranged to bypass the terminal line from one direction. As a result, it is possible to suppress a part of the lead path of the terminal T from being extremely long, and to suppress an increase in volume.

It should be noted that the above-described embodiments may be modified as follows. The above-described embodiments and the following modifications can be implemented in combination with one another as long as there is no technical contradiction.

Although the end frame 17 is formed of a conductive member in the above embodiment, it may be formed of a nonconductive member.

In the above embodiment, the end frame 17 has the recess 17*a*, and the rotation detection unit 70 is provided in the recess 17*a*. However, the present disclosure is not limited thereto. For example, the recess 17*a* may be omitted, and the rotation detection unit 70 may be provided in the space S formed by the terminal line 33*a* in the housing 15.

In the above embodiment, the terminal T passes radially outward of the terminal line 33*a*, but the terminal T may pass radially inward of the terminal line 33*a* or at the same position in the radial direction thereof.

In the above embodiment, the five terminals T are bifurcated along the terminal line 33*a*, but the five terminals may not branch.

In the above embodiment, the guide member 60 is used. However, the guide member 60 may be omitted. Further, in the guide member 60, the guide main body 61 may be omitted.

In the above embodiment, the guide member 60 is formed in an annular shape, but may be formed in another annular shape. In addition, the guide member 60 may have a non-annular shape such as a C-shape which is partially interrupted in the circumferential direction. Also, the guide member 60 may be configured of a plurality of members.

In the above embodiment, the terminal line 33*a* as the connection line is formed of a flexible conductive wire integrally formed with the stator coil 33. However, the terminal line is not limited thereto. For example, the connection line may be formed of a rigid conductor such as a bus bar.

In the above embodiment, the Hall element 72 is used as the rotation detection unit 70. However, the rotation detection unit is not limited thereto. For example, another rotation detection device using an MR element, a resolver or an encoder may be adopted. In addition, the number of sensor lines may vary depending on each rotation detection device.

In the above embodiment, although the first three-phase winding 40 and the second three-phase winding 50 are connected to each inverter circuit by the delta connection, the first three-phase winding 40 and the second three-phase winding 50 may be connected to each inverter circuit by a star connection.

In the above-described embodiment, although the two-system inverter circuits are used, one-system inverter circuit may be used.

In the stator coil 33 of the above embodiment, the U+phase winding 41*a*, the Z+phase winding 51*e*, the Y−phase winding 51*d*, the W−phase winding 41*f*, the V+phase winding 41*c*, the X+phase winding 51*a*, the Z−phase winding 51*f*, the U−phase winding 41*b*, the W+phase winding 41*e*, the Y+phase winding 51*c*, the X−phase winding 51*b*, and the V−phase winding 41*d* are circumferentially arranged in this order and connected. However, the order is not limited to this configuration, and the order can be changed as appropriate.

In the above embodiment, the stator coil 33 is a connection mode on the premise of energization by a phase difference of 10 poles and 12 slots, but the stator coil is not limited thereto. For example, the stator coil can be the connection modes such as 2 serial 2 parallel connection, 4 series connection, 4 parallel connection and the like. Also, the number of poles and the number of slots can be changed as appropriate.

In the assumable motor device, the rotational position of the rotor is detected by the rotation detection unit. However, depending on the installation location of the rotation detection unit, the motor device may become large in size. Therefore, it is desirable to miniaturize the motor device.

The present disclosure was made in order to solve the above-mentioned subject, and provides a miniaturized motor device.

A motor device for solving the above subject has a motor body including a stator and a rotor, and a control unit for controlling the motor body. The hydro unit is disposed between the motor body and the control unit. In the motor body, a plurality of connection lines for conducting electricity between the coil of the stator and the control unit are drawn around. A rotation detection unit for detecting the rotation of the rotor is provided in a space formed between the drawn connection lines and the motor rotation shaft.

According to the above configuration, since the rotation detection unit is provided in the space formed between the plurality of drawn connection lines and the motor rotation shaft. Therefore, the motor device with such configuration can be miniaturized as compared with a motor device having a rotation detection unit at a position deviating from the space.

The invention claimed is:

1. A motor device, comprising:
   a motor body including a stator and a rotor;
   a control unit configured to control the motor body; and
   a hydro unit disposed between the motor body and the control unit, wherein
   in the motor body,
      a plurality of connection lines is configured to energize a coil of the stator and the control unit, the plurality of connection lines comprising a drawn around portion that is drawn around a motor rotation shaft in a circumferential direction of the motor body,
      a space is defined between the drawn around portion of the plurality of connection lines and the motor rotation shaft, and
      a rotation detection unit configured to detect rotation of the rotor is provided in the space formed between the drawn around portion of the plurality of connection lines and the motor rotation shaft, the rotation detection unit positioned between the drawn around portion of the plurality of connection lines and the motor rotation shaft with respect to a radial direction of the motor body.

2. The motor device according to claim 1, wherein
   in the motor body,
   the rotor is disposed radially inward of the stator, and
   a guide member that draw around a respective connection line in a circumferential direction, the guide member being on one side in an axial direction of the rotor and radially outward of the rotor is provided, and
   the rotation detection unit is provided radially inward of the guide member.

3. The motor device according to claim 1, wherein
   the motor body has a bottomed cylindrical yoke housing for housing the stator and the rotor, and an end frame for closing an opening portion of the yoke housing,
   the end frame has a recess which is depressed toward the rotor in an axial direction and is inserted into the space formed by the connection lines, and
   the rotation detection unit is provided in the recess.

4. The motor device according to claim 3, wherein
   the end frame contains a conductive member.

5. The motor device according to claim 1, wherein
   the rotation detection unit is connected to a terminal for energizing the control unit,
   the hydro unit has an insertion hole through which the plurality of connection lines and the terminal are inserted,
   the connection lines are inserted along the insertion hole provided along an axial direction, and
   the terminal is provided so as to pass radially outward of a respective connection line while avoiding the respective connection line extending in the axial direction in the insertion hole.

6. The motor device according to claim 2, wherein
   the motor body has a bottomed cylindrical yoke housing for housing the stator and the rotor, and an end frame for closing an opening portion of the yoke housing,
   the end frame has a recess which is depressed toward the rotor in the axial direction and is inserted into the space formed by the connection lines,
   the rotation detection unit is provided in the recess, and
   the recess is provided radially inward of the guide member.

7. A motor device, comprising:
   a motor body including a stator and a rotor;
   a control unit configured to control the motor body; and
   a hydro unit disposed between the motor body and the control unit,
   wherein
   in the motor body,
   a plurality of connection lines configured to energize a coil of the stator and the control unit are drawn around, and
   a rotation detection unit configured to detect rotation of the rotor is provided in a space formed between the drawn connection lines and a motor rotation shaft,
   the motor body and the control unit are electrically connected through an insertion hole provided in a housing of the hydro unit,
   the motor body has a bottomed cylindrical yoke housing for housing the stator and the rotor, and an end frame for closing an opening portion of the yoke housing,
   the rotation detection unit is connected to a terminal for energizing the control unit,
   the terminal includes an output terminal for outputting sensor information to the control unit and a power supply terminal for supplying power to Hall element,
   the Hall element is disposed on a sensor substrate, and
   the sensor substrate and the terminal are held on a circuit holder and the circuit holder is fixed to the end frame.

8. The motor device according to claim 1, wherein
   the hydro unit is sandwiched between the motor body and the control unit along an axial direction of the motor body.

9. The motor device according to claim 1, wherein
   the plurality of connection lines are connected to the control unit by extending through the hydro unit.

10. The motor device according to claim 1, wherein
the motor body has a bottomed cylindrical yoke housing for housing the stator and the rotor, and an end frame for closing an opening portion of the yoke housing,
the end frame has a recess which is depressed in a direction toward the rotor in an axial direction and is inserted into the space formed by the connection lines, the recess positioned on a side of the end frame that is opposite to the stator and the rotor, and
the rotation detection unit is provided in the recess.

11. A motor device, comprising:
a motor body including a stator and a rotor;
a control unit configured to control the motor body; and
a hydro unit disposed between the motor body and the control unit, wherein
in the motor body,
a plurality of connection lines configured to energize a coil of the stator and the control unit are drawn around, and
a rotation detection unit configured to detect rotation of the rotor is provided in a space formed between the drawn connection lines and a motor rotation shaft, wherein
the rotation detection unit is connected to a terminal for energizing the control unit,
the hydro unit has an insertion hole through which the plurality of connection lines and the terminal are inserted,
the connection lines are inserted along the insertion hole provided along an axial direction, and
the terminal is provided so as to pass radially outward of the connection line while avoiding the connection line extending in the axial direction in the insertion hole.

* * * * *